(12) United States Patent
Sprague

(10) Patent No.: US 6,268,321 B1
(45) Date of Patent: Jul. 31, 2001

(54) GREASE PREPARED FROM CHEMICALLY INERT OIL AND THICKENING AGENT, AND PROCESS FOR MAKING SAME

(75) Inventor: Lee G. Sprague, North Augusta, SC (US)

(73) Assignee: Halocarbon Products Corporation, River Edge, NJ (US)

( * ) Notice: Subject to any disclaimer, the term of this patent is extended or adjusted under 35 U.S.C. 154(b) by 0 days.

(21) Appl. No.: 09/554,995

(22) PCT Filed: Nov. 5, 1998

(86) PCT No.: PCT/US98/23594

§ 371 Date: May 24, 2000

§ 102(e) Date: May 24, 2000

(87) PCT Pub. No.: WO99/27038

PCT Pub. Date: Jun. 3, 1999

(51) Int. Cl.$^7$ .................................. C10M 115/06

(52) U.S. Cl. .................... 508/590; 524/462; 524/463; 524/464

(58) Field of Search .............. 508/590; 524/462, 524/463, 464

(56) References Cited

U.S. PATENT DOCUMENTS

| | | |
|---|---|---|
| 2,695,880 | 11/1954 | Benning et al. . |
| 2,706,715 | 4/1955 | Conner . |
| 2,927,895 | 3/1960 | Neunherz . |
| 2,992,988 | 7/1961 | Dipner . |
| 3,076,765 | 2/1963 | West et al. . |
| 4,691,065 * | 9/1987 | Dannels ................. 570/139 |
| 5,108,632 | 4/1992 | Thomas et al. . |
| 5,182,342 | 1/1993 | Feiring et al. . |
| 6,040,277 * | 3/2000 | Caporiclio ............. 508/590 |

FOREIGN PATENT DOCUMENTS 6-340718  12/1994  (JP) .

* cited by examiner

*Primary Examiner*—Margaret Medley
(74) *Attorney, Agent, or Firm*—Norris McLaughlin & Marcus

(57) ABSTRACT

A grease made by combining polychlorotrifluoroethylene oil with a thickening agent comprising polychlorotrifluoroethylene (PCTFE) polymer. The thickening agent is made by polymerizing chlorotrifluoroethylene [R-1113] in the presence of a telogen, which is 2,2-dichloro-1,1,1-trifluoroethane[R-123] or a homolog thereof, namely $CF_3$—$CF_2$—$CHCl_2$, $CF_3$—$CF_2$—$CF_2$—$CHCl_2$, and $CF_3$—$CF_2$—$CF_2$—$CF_2$—$CHCl_2$.

6 Claims, No Drawings

GREASE PREPARED FROM CHEMICALLY INERT OIL AND THICKENING AGENT, AND PROCESS FOR MAKING SAME

This application is a 371 of PCT/US98/23594, which was filed on Nov. 5, 1998.

BACKGROUND

1. Field of the Invention

The present invention relates to an improved method of preparing a grease, and to the grease produced thereby.

2. Description of Related Arts

The use of grease to lubricate fittings is well known to persons skilled in the art. Grease is essentially thickened oil, and because of its viscosity is well suited for lubricating surfaces where oil might run off or drip.

Polychlorotrifluoroethylene polymer of controlled molecular weight has been used by the assignee of this application as a thickening agent, which is then incorporated into polychlorotrifluoroethylene oil for the preparation of a grease. The grease produced is characterized by excellent properties.

In the process of making this grease, the molecular weight of the polymer must be carefully controlled in order to achieve acceptable results, and for this purpose use had been made previously of carbon tetrachloride as a telogen.

However, carbon tetrachloride, because it is harmful to the ozone layer and the environment, is no longer a desirable telogen. Therefore, a search was made to find a suitable substitute for carbon tetrachloride.

From other work in the telomerization field, one would expect that chloroform could be used as a substitute for carbon tetrachloride. It is well known that chloroform in large ratios to chlorotrifluoroethylene [R-1113] was used to make chlorotrifluoroethylene oils of the type used here. See, for example, *Preparation, Properties, and Technology of Fluorine and Organic Fluoro Compounds*, edited by Charles Slesser and Stuart R. Schram, McGraw-Hill Book Company, Inc., 1951, page 607. However, the results that we have achieved using chloroform to make higher controlled molecular weight polymers have been disappointing.

The use of 2,2-dichloro-1,1,1-trifluoroethane [R-123] as polymerization medium in the preparation of fluorine polymers having fluoroolefin units as building blocks is known from Japanese Unexamined Patent Publication No. 6-340718, which was laid open on Dec. 13, 1994. R-1113 is listed as an example of a fluoroolefin monomer useful in the process disclosed therein. However, there is no mention therein of its use as a thickening agent for incorporation into polychlorotrifluoroethylene oil for the preparation of a grease.

Moreover, the Japanese application actually teaches away from the use of R-123 as a telogen. The Japanese application teaches that R-123 provides "some" chain transferring. However, the Japanese application expressly teaches that chain transfer compounds usually must be added to the reaction medium to control the molecular weight of the polymer. Therefore, the use of R-123 as an acceptable telogen per se cannot be gleaned from the Japanese application. The clear suggestion is that telogen additives must be employed; the R-123 alone is insufficient.

Further, the examples of the Japanese application lead to the use of very high amounts of R-123 as solvent. The amounts of R-123 employed are approximately 2.5 and 10 times the amount of monomers employed.

U.S. Pat. No. 5,182,342 describes a process for the free radical polymerization of fluoromonomers, including R-1113, in selected hydrofluorocarbon solvents. The teachings of the patent purport to be very broad, and appear to embrace also the use of R-123 as the polymerization solvent. However, R-123 is not specifically mentioned as an example. Moreover, there is no teaching therein that R-123 is an acceptable telogen per se, nor is there any teaching therein of the use of the resulting polymer in the preparation of a grease.

Accordingly, there remained a need to find an acceptable substitute for carbon tetrachloride, which would be useful to make chlorotrifluoroethylene polymer of controlled molecular weight, which, in turn, could then be combined with polychlorotrifluoroethylene oil to make a grease.

SUMMARY OF THE INVENTION

It has now been found that R-123 is an excellent telogen per se, and is useful alone as a telogen for polymerizations of chlorotrifluoroethylene monomer, leading to the production of chlorotrifluoroethylene polymer of controlled molecular weight. For this use, R-123 is superior to carbon tetrachloride and chloroform, both well regarded telogens. The chlorotrifluoroethylene polymer produced may then be combined with polychlorotrifluoroethylene oil to make a grease, which, we have discovered, has excellent properties.

In view of the successful use of R-123 as a telogen, we expected that closely related homologs thereof should be useful in a similar manner.

Accordingly, the invention, in a first embodiment, relates to an improved process for preparing polychlorotrifluoroethylene polymer comprising polymerizing chlorotrifluoroethylene monomer in the presence of a telogen, wherein the improvement comprises using as the telogen a compound of the formula $CF_3-(CF_2)_n-CHCl_2$, wherein n is 0, 1, 2 or 3.

A second embodiment of the present invention relates to a process for preparing a grease comprising combining this polychlorotrifluoroethylene polymer with polychlorotrifluoroethylene oil in amounts and under conditions resulting in the production of a grease.

DETAILED DESCRIPTION OF THE INVENTION

Telomerization processes are well known to persons skilled in the art, and, accordingly, the details thereof will not be repeated here. The essence of the present invention resides in the discovery that R-123 has surprising abilities as a telogen. We have discovered that R-123 is a superior telogen to carbon tetrachloride not only because it has less ozone depletion potential, but also because smaller amounts of R-123 than carbon tetrachloride are required to produce useful telomers.

Further on this point, it is well known that telomer chain length is regulated by the amount and nature of the telogen. The telogen occasionally reacts with the growing reactive polymer to terminate the existing polymer chain while creating a new reactive molecule, which will start a new chain. This new chain will grow by addition of new monomer until the new chain is terminated by telogen, and the process continues.

This phenomena of "chain transfer" is dependent upon two primary factors: the strength of the bond broken in the telogen, and the stability of the resultant reactive telogen radical. Thus, different telogens have different abilities to chain transfer. These abilities are often expressed as a chain transfer coefficient, C∞, which is a ratio of the probabilities a growing polymer will react with telogen or with more monomer.

Extrapolating from data for other telogens and monomers, C∞ for R-123 would have been expected to be smaller than for carbon tetrachloride. Thus, R-123 would have been expected to be less likely to chain transfer, and, in converse, would have been expected to give longer telomers, having higher molecular weight.

However, quite contrary to what would have been expected, we discovered that R-123 is much more likely to chain transfer than carbon tetrachloride. Had R-123 been less likely to chain transfer a greater amount of R-123 would have been needed to achieve the desired molecular weight. However, we discovered that approximately 90% less R-123 than carbon tetrachloride was required.

In view of the results achieved with R-123, it would be readily apparent to persons skilled in the art that the closely related homologs $CF_3$—$CF_2$—$CHCl_2$, $CF_3$—$CF_2$—$CF_2$—$CHCl_2$, and $CF_3$—$CF_2$—$CF_2$—$CF_2$—$CHCl_2$ should be useful in a similar manner. In this regard, the "$CHCl_2$" portion of the molecule is the most important structural feature as far as the telomerization reaction is concerned since it is this portion of the molecule that undergoes change to form the reactive species that initiate, chain transfer, or terminate the reaction. Accordingly, it should be possible to lengthen the perfluoroalkyl portion of the molecule without adversely affecting the reaction. However, the use of R-123 is the preferred embodiment.

In general, the amount of R-123 or homolog used is, in terms of weight, less than the amount of R-1113 monomer employed. In the preferred embodiment, wherein R-123 is used, the weight ratio of R-123:R-1113 is less than 1:1. Preferably, the weight ratio of R-123:R-1113 ranges from 0.13:1 to 0.17:1, most preferably from 0.14:1 to 0.16:1.

The ultimate goal is to prepare a grease having excellent properties. The polychlorotrifluoroethylene polymer produced according to the inventive process is used as a thickening agent in the preparation of the grease. For this purpose, the molecular weight of the polychlorotrifluoroethylene must be controlled. If the molecular weight is too high, then it will not be sufficiently soluble in the oil to serve as a thickening agent. On the other hand, if the molecular weight is too low, then it will not have the desired thickening properties. When the molecular weight is in an effective region, then the grease properties can be controlled by the amount of thickening agent used. Another method to control the grease properties is by varying the viscosity of the oil.

In general, we considered a thickening agent to have "desired thickening properties" if a mixture of oil and the thickening agent in a weight ratio of approximately 85:15 to 95:5 produced a grease with acceptable "penetration" and "oil separation" properties. "Penetration" is measured by the depth a special cone penetrates into a cup filled with the grease. In general, our goal is to produce greases having penetrations over the range of 175–340. A penetration of 350 or higher shows the mixture is too soft for use as a grease. Another measure is oil separation from the grease after certain treatments. A good grease will have a separation of less than 10%. Still another measure of a good thickening agent is that it will give reduced penetration values after "working", that is after the grease is extruded through fine openings under pressure.

As shown in the examples below, if the teachings set forth herein are followed, the polychlorotrifluoroethylene polymer produced according to the inventive process will have sufficient molecular weight such that, when mixed with polychlorotrifluoroethylene oil in a weight ratio of oil:polymer of approximately 85:15 to 95:5, there will result a grease having excellent penetration and oil separation properties.

The invention will now be further described with reference to the following non-limiting examples:

EXAMPLE 1

Carbon Tetrachloride as Telogen (112-183-1 and 116-097 to 099)

The initiator was prepared by mixing 24.5 g acetic anhydride and 13.5 g of 30% hydrogen peroxide in 125 mL of carbon tetrachloride. A solution of 12.6 g sodium carbonate in 53 mL water was added with stirring at 5°–11° C.

The organic phase containing acetyl peroxide and carbon tetrachloride was separated and added to 1270 g of chilled carbon tetrachloride and 1.36 kg of chlorotrifluoroethylene [R-1113]. The mixture was heated in a pressure reactor at 40° C. for 6 days, yielding 1.29 kg crude polymer.

A mixture of 6.5% of the washed, dried polymer as thickening agent in 1000 cSt polychlorotrifluoroethylene oil was used to make grease having a penetration of 314. A grease containing 13% of this polymer had a penetration of 187.

EXAMPLE 2

Chloroform as Telogen (112-187 & 116-045)

The initiator was made by addition of 24.5 g acetic anhydride and 13.5 g of 30% hydrogen peroxide in 155 g chloroform. To this was added a solution of 12.6 g sodium carbonate in 53 mL water while stirring at 5°–11° C.

The organic phase containing acetyl peroxide and chloroform was separated and added to 990 g of chilled chloroform and 1.43 kg of R-1113 in a pressure reactor and then heated at 50° C. for 6 days. The chloroform was removed in vacuo from the reaction mixture to leave 1.69 kg of crude polymer. The polymer was washed with acetone and water and dried in a hot box for several days.

Ninety-five and three tenths of a gram [6.5%] of this polymer and 1362 g of 1000 cSt polychlorotrifluoroethylene oil were used to make grease having penetration of 386. When worked the same grease had a penetration of 418.

EXAMPLE 3

Chloroform as Telogen (116-085)

The initiator was prepared as before and the organic phase was separated and mixed with 425 g chloroform and 1.10 kg of R-1113. This mixture was heated in a pressure reactor of 40° C. for 8 days. The pressure in the reactor was released, 364 g of chloroform was removed in vacuo leaving 973 g of crude polymer. The polymer was washed with acetone and water and dried in a hot box for several days.

Of this polymer, 126 g and 1816 g of 1000 cSt polychlorotrifluoroethylene oil were used to make grease having a penetration of more than 400.

Another grease was made with 252 g of this polymer and 1816 g of 1000 cSt polychlorotrifluoroethylene oil. It had a penetration of 377.

EXAMPLE 4

Chloroform as Telogen (116-083)

The initiator was prepared as before and the organic phase was separated and added to 425 g of chilled chloroform and 1.25 kg of R-1113 and then heated in a pressure reactor at 40° C. for 6 days. The pressure in the reactor was released and 356 g of solvent was removed to leave 804 g crude polymer. The polymer was washed with acetone and water and dried in a hot box for several days.

A mixture of 6.5% of this polymer as thickening agent in 1000 cSt polychlorotrifluoroethylene oil was used to make grease having a penetration of more than 400.

EXAMPLE 5

Chloroform as Telogen (116-091)

The initiator was prepared as before and the organic phase was separated and added to 135 g chloroform and 1.00 kg of R-1113. This mixture was heated in a pressure reactor at 40° C. for 6 days. The pressure in the reactor was released yielding 695 g of crude polymer. The polymer was washed with acetone and water and dried in a hot box for several days.

A mixture of 13% of this polymer in 1000 cSt polychlorotrifluoroethylene oil was used to make grease having a penetration of 371 and an oil separation of 11.6%.

EXAMPLE 6

Chloroform as Telogen (116-095)

The initiator was prepared as before and the organic phase was separated and added to 1.19 kg of R-1113 and heated in a pressure reactor at 40° C. for 8 days. The pressure in the reactor was released yielding 804 g of crude polymer. The polymer was washed with acetone and water and dried in a hot box for several days.

A grease containing 13% of this polymer had a penetration of 360.

EXAMPLE 7

Chloroform as Telogen (116-103)

The initiator was prepared as before and the organic phase containing acetyl peroxide and chloroform was separated and added to 1.24 kg of R-1113 and heated in a pressure reactor at 40° C. for 15 days. The crude polymer, 1.146 kg, was washed with acetone and water and dried in a hot box overnight.

A grease containing 13% of this polymer had a penetration of 339.

The foregoing examples establish the following: Example 1 illustrates the standard use of carbon tetrachloride as telogen in the polymerization of R-1113 to PCTFE for use as a thickening agent in oil to make a grease.

Examples 2 through 7 show attempts to make usable greases from several polymers made with chloroform as telogen. These attempts failed in that it took far too much of any of these polymers to get a grease with a penetration barely within the acceptable region, and none could be made into a grease with a low penetration. Also the greases failed in that working did not reduce the penetration and they suffered from too high an oil separation.

Examples 8 through 12, below, show, surprisingly, that R-123 made telomers [controlled molecular weight polymers] useful for the preparation of good greases. The greases obtained gave desirable penetrations and low oil separation at reasonable concentrations, and without the ozone and other environmental disadvantages inherent in the use of carbon tetrachloride.

Example 13 shows the use of a lower viscosity oil to make a grease with higher penetration which can be used as low as −40° C.

EXAMPLE 8

2,2-Dichloro-1,1,1-trifluoroethane as Telogen (116-131)

The initiator was prepared by mixing 24.5 g acetic anhydride and 13.5 g of 30% hydrogen peroxide in 191 g of 2,2-dichloro-1,1,1-trifluoroethane. A solution of 12.6 g sodium carbonate in 100 mL water was added while stirring for about 0.5 hour at 0°–10° C.

The organic phase, containing both the initiator, acetyl peroxide, and the telogen, 2,2-dichloro-1,1,1-trifluoroethane, was combined with 1.25 kg of R-1113 in a pressure reactor and heated at 40° C. for 13 days. The pressure in the reactor was then released and 1105 g of crude polychlorotrifluoroethylene polymer was recovered. The crude polymer was washed with acetone and water and dried in a hot box for several days.

A mixture of 6.5% of this polymer as thickening agent in 1000 cSt polychlorotrifluoroethylene oil was used to make grease having a penetration of 323 and an oil separation of 3.3%.

In a second preparation, 252 g [13%] of this polymer and 1816 g of 1000 cSt oil were used to make a grease having a penetration of 219.

EXAMPLE 9

2,2-Dichloro-1,1,1-trifluoroethane as Telogen (116-149)

The above polymerization was repeated using 1.30 kg of R-1113. The polymer that was recovered weighed 1153 g.

One hundred and twenty six grams of the washed, dried polymer and 1816 g of 1000 cSt polychlorotrifluoroethylene oil were used to make a grease with a penetration of 300.

EXAMPLE 10

2,2-Dichloro-1,1,1-trifluoroethane as Telogen (116-157)

The initiator-telogen combination was prepared by the reaction of 262 g acetic anhydride and 137 g of 30% hydrogen peroxide in 1944 g of 2,2-dichloro-1,1,1-trifluoroethane while stirring in the presence of a solution of 128 g sodium carbonate in 500 mL water at 0°–5° C.

The organic phase and 12.7 kg of R-1113 were charged to a pressure reactor and heated at 40° C. for 15 days. The pressure in the reactor was released and 11.4 kg polymer was recovered.

A grease consisting of one part polymer and 14.4 parts of 1000 cSt polychlorotrifluoroethylene oil had penetration of 295.

EXAMPLE 11

2,2-Dichloro-1,1,1-trifluoroethane as Telogen

The initiator-telogen combination is prepared as per Example 10. This combination is then used in a polymerization so that the starting mole ratio of R-123 to R-1113 is 0.108 to 1.

The resulting polymer is used to thicken 1000 cSt polychlorotrifluoroethylene oil where the weight ratio is 6.5 polymer to 100 oil. The grease will have a penetration of 310–340.

EXAMPLE 12

2,2-Dichloro-1,1,1-trifluoroethane as Telogen

A grease is made from the same polymer as described in Example 10 where the ratio of polymer to oil is 13 to 100. The grease will have a penetration of 175–205.

EXAMPLE 13

2,2-Dichloro-1,1,1-trifluoroethane as Telogen

A grease is made from the same polymer as described in Example 10 where 4.5 parts of polymer are used with 50 parts of 6.3 cSt polychlorotrifluoroethylene oil. The grease will have a penetration of 310–340. Because of the low viscosity of the oil used this grease will maintain its lubricating properties to as low as −40° C.

EXAMPLE 14

Mixture of 2,2-Dichloro-1,1,1-trifluoroethane and 1,1,1-Trichloro-2,2,2-trifluoroethane as Telogen (116-143)

The initiator was prepared by from 24.5 g acetic anhydride and 13.5 g of 30% hydrogen peroxide in 30 g of 2,2-dichloro-1,1,1-trifluoroethane and 200 g of 1,1,1-trichloro-2,2,2-trifluoroethane.

The organic phase of the initiator preparation and 1.25 kg of R-1113 were heated in a pressure reactor at 40° C. for 7 days. After workup 1189 g of polymer was obtained.

The polymer was used to make a grease with 6.5% as thickening agent. A penetration of 290 and an oil separation of 20% were obtained.

Example 14 shows that telomerization with R-123 in the presence of trichlorotrifluoroethane reduces the value of R-123 as a telogen by giving a polymer with too high an oil separation.

The properties of the greases made according to each of the foregoing examples are summarized in Table 1 below.

TABLE 1

Effect of Telogen and Polymer Concentration in Grease Properties

| Example # | Telogen | Telogen/R-1113 In Moles/Mole | % Polymer In 1000 cSt Oil | Penetration |
|---|---|---|---|---|
| 1 | $CCl_4$ | 0.82 (m/m) | 6.5 | 314(a) |
|   |   |   | 13 | 187 |
| 2 | $CHCl_3$ | 0.78 (m/m) | 6.5 | 386(b) |
| 3 | $CHCl_3$ | 0.51 (m/m) | 6.5 | >400 |
|   |   |   | 13 | 377 |
| 4 | $CHCl_3$ | 0.45 (m/m) | 6.5 | >400 |
| 5 | $CHCl_3$ | 0.28 (m/m) | 13 | 371(c) |
| 6 | $CHCl_3$ | 0.13 (m/m) | 13 | 360 |
| 7 | $CHCl_3$ | 0.12 (m/m) | 13 | 339 |
| 8 | $CF_3CHCl_2$ | 0.12 (m/m) | 6.5 | 323(d) |
|   |   |   | 13 | 219 |
| 9 | $CF_3CHCl_2$ | 0.11 (m/m) | 6.5 | 300 |
| 10 | $CF_3CHCl_2$ | 0.12 (m/m) | 6.5 | 295 |
| 11 | $CF_3CHCl_2$ | 0.108 (m/m) | 6.5 | 310–340 |
| 12 | $CF_3CHCl_2$ | 0.108 (m/m) | 13.0 | 175–205 |
| 13 | $CF_3CHCl_2$ | 0.108 (m/m) | 9.0(e) | 310–340 |
| 14 | $CF_3CHCl_2/CF_3CCl_3$ | 0.12 (m/m) | 6.5 | 290(f) |

(a)Typical Oil Separation: <10%
(b)Worked Penetration: 418
(c)Oil Separation: 11.6%
(d)Oil Separation: 3.3%
(e)6.3 cSt oil used for this grease
(f)Oil Separation: 20%
Grease penetration---ASTM D-217-88, "Cone penetration of Lubricating Grease"
Oil Separation------Federal Test Method Standard 791C Method No. 321.3, September 30, 1986, "Oil Separation from Lubricating Grease"

It will be understood that the specification and examples are illustrative but not limitative of the present invention and that other embodiments within the spirit and scope of the invention will suggest themselves to those skilled in the art.

What is claimed is:

1. A process for preparing a grease comprising:

a) polymerizing chlorotrifluoroethylene [R-1113] monomer in the presence of a telogen to yield polychlorotrifluoroethylene polymer, and thereafter b) combining a thickening agent comprising the product of a) with polychlorotrifluoroethylene oil in amounts and under conditions resulting in the production of a grease, wherein the telogen in a) is a compound of the formula $CF_3$—$(CF_2)_n$—$CHCl_2$, wherein n is 0, 1, 2 or 3.

2. The process according to claim 1, wherein the telogen in a) is 2,2-dichloro-1,1,1-trifluoroethane[R-123].

3. The process according to claim 2, wherein a) the weight ratio of R-123:R-1113 is less than 1:1.

4. The process according to claim 3, wherein a) the weight ratio of R-123:R-1113 ranges from about 0.13:1 to about 0.17:1.

5. The process according to claim 3, wherein b) the weight ratio of polychlorotrifluoroethylene polymer:polychlorotrifluoroethylene oil ranges from 15:85 to 5:95.

6. The process according to claim 4, wherein b) the weight ratio of polychlorotrifluoroethylene polymer:polychlorotrifluoroethylene oil ranges from 15:85 to 5:95.

* * * * *